Nov. 4, 1941.  G. E. EWERTZ  2,261,495
LIQUID LEVEL RESPONSIVE DEVICE
Filed April 14, 1939
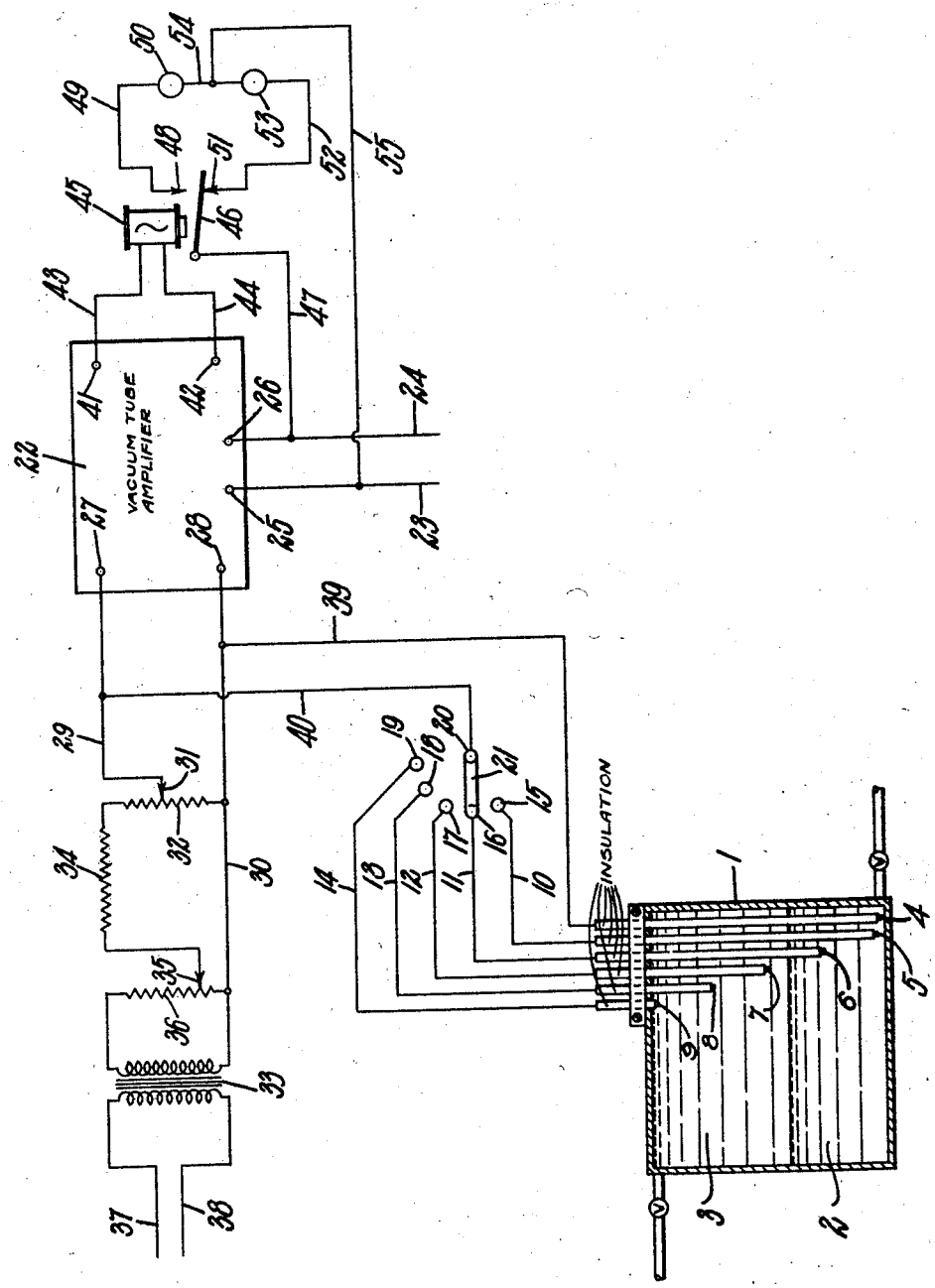
Inventor:
Gordon E. Ewertz,
by Franklin E. Low
Att'y.

Patented Nov. 4, 1941

2,261,495

UNITED STATES PATENT OFFICE 2,261,495

LIQUID LEVEL RESPONSIVE DEVICE

Gordon E. Ewertz, Elizabeth, N. J.

Application April 14, 1939, Serial No. 267,947

6 Claims. (Cl. 177—311)

This invention relates broadly to a liquid level responsive device, and particularly to an electrically actuated device for gauging the contents of a tank containing two or more fluids having different electrical resistances.

It is a well known fact that it is prohibitive to use any device in connection with a tank containing hydrocarbons or other dangerous liquids if said device causes a measurable electric current to flow in said tank. Under certain circumstances it is even prohibitive to utilize an electrically actuated device in connection with a tank containing water.

The primary object of this invention is to provide a liquid level responsive device for fluid containers, as, for example, water in tanks, or, a liquid supporting other non-mixing liquids, as, for example, water and oil, or, other fluids having different electrical resistances.

Another object of the invention is to provide an apparatus that may be locally and/or remotely operated and observed, and that makes possible a safe and accurate measuring of a liquid, as, for example, a hydrocarbon.

As it is well known in the electrical art that a small change of input voltage to a vacuum tube amplifier results in a large change of power output from said amplifier, and that electrical devices may be operated by the change of input voltage, it is an object of this invention to utilize such a structure in the apparatus of this invention and at the same time limit the possible flow of current in a tank to a value so small that hazards caused by electrolysis and sparking are eliminated.

The invention consists of a liquid level responsive device as set forth in the following specification and particularly as pointed out in the claims.

The figure of the drawing is a diagrammatical illustration of a liquid level responsive device embodying my invention and as applied to a tank containing water and a hydrocarbon.

In the drawing, 1 represents a closed container, as, for example, a fuel tank of a hard tank fuel system wherein water 2 supports a hydrocarbon 3 in a manner well known to those skilled in the art. Obviously the tank may contain other fluids having different electrical resistances, as, for example, water and air, and the tank may be open or closed as circumstances demand. Mounted within the tank 1 are a plurality of electrodes 4, 5, 6, 7, 8 and 9, all insulated from each other and from the tank. Any number of electrodes may be provided for the tank 1 as may be desired. As illustrated these electrodes consist of insulated rods of different lengths exposed to the fluids in the tank at different levels therein, but it is evident that said electrodes may be of any desired construction provided they have contact points embodied therein which are exposed to the fluids in the tank, are located at different elevations in the tank, and are insulated therefrom. The electrode 4 is common to all the circuits which include the other electrodes, and the tank itself may be used as a common lead in place of the electrode 4 if it is so desired. The electrodes 5, 6, 7, 8 and 9 are connected by wires 10, 11, 12, 13 and 14 respectively to terminals 15, 16, 17, 18, and 19 respectively of a selector switch 20 having an arm 21 embodied therein which is arranged to contact with said terminals.

The operating mechanism of the gauge may be located adjacent to the tank 1, or at a distance therefrom, and embodies therein an audio-frequency vacuum tube amplifier 22, well known in the art, and operated from a suitable source of electric supply. There are several types of vacuum tube amplifiers available, all well known in the art, and in which a small change of input voltage results in a large change of power output, capable of actuating lights, bells, relays and other electrical devices, and it is obvious that the type of current provided must be that for which the amplifier is designed to operate from. The electric current for the amplifier 22 is supplied through wires 23 and 24 connected to terminals 25 and 26 respectively provided upon said amplifier.

The amplifier 22 is provided with input terminals 27 and 28 to which wires 29 and 30 respectively of an input circuit are attached. The wire 29 is connected to a contact 31 of an adjustable resistor 32; while the wire 30 is connected to the secondary winding of a transformer 33. Included in the input circuit with the adjustable resistor 32 is a resistor 34 connected to the contact 35 of an adjustable resistor 36 in turn connected to the secondary winding of the transformer 33. The transformer 33 is excited by a source of alternating current through wires 37 and 38. It will be evident that the magnitude of the input voltage applied to the terminals 27 and 28 is dependent on the position of the contact 31 on the adjustable resistor 32, the resistance of said resistor 32, the resistance of the resistor 34, the position of the contact 35 on the adjustable resistor 36, the resistance of said resistor 36, and the voltage across the secondary of the transformer 33.

The electrodes 4, 5, 6, 7, 8 and 9 are connected across the input circuit by connecting the electrode 4 to the input wire 30 by means of a wire 39, and by connecting the arm 21 of the selector switch 20 to the input wire 29 by means of a wire 40.

It will be understood that the resistors 32 and 34 may be one and the same, and of any value. Also that the adjustable resistor 36 is merely a convenient manner of taking a reduced voltage from the secondary of the transformer 33 in order that a commercially available transformer may be used for the transformer 33. It is also possible to substitute one or more high impedance choke coils for the resistors 34 and 32, or even for the resistor 36.

The frequency of the input voltage applied to the input of the vacuum tube amplifier 22 may be whatever desired; and the transformer 33 may be replaced by any source of alternating or direct current. A vacuum tube oscillator can, for example, be employed in place of the transformer 33 and its output voltage applied through current limiting and voltage reducing means as shown by 34, 32 and 31 to the input of the vacuum tube amplifier 22, or, a source of interrupted direct current such as is obtained from a vibrator or any other current interrupting means may be similarly applied to the input of the vacuum tube amplifier 22 without departing from the spirit of the invention, as each of these alternate electrical units mentioned is the equivalent of the corresponding unit illustrated in the drawing.

Connected to the output terminals 41 and 42 of the vacuum tube amplifier 22 by wires 43 and 44 respectively is an alternating current relay 45 which operates a single pole double throw switch 46, the arm of which is connected by a wire 47 to the supply wire 24 for said amplifier. A contact 48 of the switch 46 is connected by a wire 49 to a lamp 50, and a contact 51 of said switch is connected by a wire 52 to a lamp 53. The lamps 50 and 53 are connected together by a wire 54, and the latter is connected by a wire 55 to the supply wire 23 for the vacuum tube amplifier 22. It will thus be seen that when the relay 45 is energized that the lamp 50 will be illuminated and the lamp 53 will be extinguished, and that when the relay is deenergized that the lamp 53 will be illuminated and the lamp 50 will be extinguished.

It will be understood that a lamp, bell or any other responsive means may be used in place of the relay 45, and that whether the responsive means employed is also used for controlling auxiliary devices is immaterial.

The general operation of the device hereinbefore specifically described is as follows: Assume first that the arm 21 of the selector switch 20 is in circuit with a contact connected to an electrode that is exposed to the hydrocarbon 3 in the container 1; that the transformer 33 has a secondary voltage of 3.15 volts at 60 cycles, that the adjustable resistor 36 is, for example, 100 ohms, and that the contact 35 is so positioned that the voltage is reduced to 0.035 volt. Then if the resistor 34 is 8,000,000 ohms and the adjustable resistor 32 is 2,000,000 ohms, the contact 31 may be positioned at a point where there would be an input voltage of 0.0035 volt applied to the input of the vacuum tube amplifier 22. In this particular instance the amplifier 22 is designed to have a sufficient gain to energize the relay 45, thereby causing the arm of the switch 46 to engage the contact 48 and thereby illuminate the lamp 50 with an input voltage of 0.0035 volt to said amplifier. The hydrocarbon 3 being a nonconductor of electricity there would be no current flowing in the tank, and the voltage present in the tank would be 0.0035 volt.

Again assuming that the arm 21 of the switch 20 is in circuit with an electrode exposed to the water in the tank, as is the case with the electrode 6 of the drawing, the input voltage to the amplifier 22 will be reduced due to the shunt action of the water, the amplifier will cease to energize the relay 45, the arm of the switch 46 will become disengaged from the contact 48 and engage the contact 51 thereby causing the lamp 50 to be extinguished and the lamp 53 to become illuminated. Thus it can be determined which of the electrodes are exposed to the non-conducting fluid 3 and which are exposed to the conducting fluid 2. Obviously, the greater the number of levels at which readings can be taken, the finer will be the readings.

The electrodes and the water 2 between them act as a volume control for the amplifier 22. The input voltage is reduced to a commercially unmeasurable value and there is no possible chance for sparking to take place. Also, because of the current limiting and voltage reducing means provided, the current which flows in the tank circuit is limited to such a low value that hazards caused by electrolysis are eliminated, and it is impossible to measure the current even with laboratory equipment. This holds true even if the electrodes are changed to contacts and they are actually closed.

The current limiting and voltage reducing means are very important in this apparatus. As an example, if the input voltage was taken from any source, the current that could flow in the tank circuit upon partial or complete cross circuit would depend upon the resistance of the circuit and the current capacity of the input voltage source. Also, unless this source is loaded by the tank circuit sufficient to reduce the input voltage, the responsive means in the output circuit of the vacuum tube amplifier 22 will not respond to changes in the tank circuit. Thus not only is the current limiting and voltage reducing means used to insure the operation of the responsive means in the output circuit of the amplifier, but it also eliminates the hazard caused by electrolysis and sparking.

I claim:

1. Liquid level responsive means having, in combination, an audio-frequency vacuum tube amplifier, a source of electric potential therefor, an input circuit including a source of alternating electric current for said amplifier, current limiting and voltage reducing means in said input circuit, a container for non-mixing fluids having different electrical resistances, electrodes in said container exposed to said fluids and connected across the input circuit of the amplifier to short circuit said input circuit through the fluid of least electrical resistance, and means in the output of the amplifier responsive to changes of input voltages to said amplifier.

2. Liquid level responsive means having, in combination, an audio-frequency vacuum tube amplifier, a source of electric potential therefor, an input circuit including a source of alternating electric current for said amplifier, current limiting and voltage reducing means in said input circuit, a container for non-mixing fluids having different electrical resistances, electrodes positioned at different levels within said container exposed to said fluids and connected to the input circuit of the amplifier to shunt said input circuit through the fluid of least electrical resistance when two of said electrodes are immersed therein, and means in the output of the amplifier responsive to changes of input voltages to said amplifier.

3. Liquid level responsive means having, in combination, an audio-frequency vacuum tube amplifier, a source of electric potential therefor, an input circuit including a source of alternating electric current for said amplifier, current limiting and voltage reducing means in said input circuit, a container for a liquid and at least one other separate hazardous fluid, said fluids having different electrical resistances, electrodes in the container exposed to said fluids and connected to the input circuit to shunt said circuit through the fluid of least electrical resistance, and means in the output of the amplifier responsive to changes of input voltages to said amplifier.

4. Liquid level responsive means having, in combination, an audio-frequency vacuum tube amplifier, a source of electric potential therefor, an input circuit including a source of alternating electric current for said amplifier, current limiting and voltage reducing means in said input circuit, a container for a liquid and another separate hazardous fluid, one of said fluids being a conductor of electricity, electrodes positioned at different levels within said container exposed to said fluids and connected across the input circuit of the amplifier to shunt said input circuit through said conducting fluid when two of said electrodes are immersed therein, and means in the output of the amplifier responsive to changes of input voltages to said amplifier.

5. Liquid level responsive means having, in combination, an audio-frequency vacuum tube amplifier, a source of electric potential therefor, an input circuit including a source of alternating electric current for said amplifier, current limiting and voltage reducing means in said input circuit, a container for water and a non-mixing hazardous fluid, the latter being a non-conductor of electricity, electrodes positioned at different levels within said container exposed to said fluids and connected across the input circuit of the amplifier to shunt said input circuit through said water when two of said electrodes are immersed therein, and means in the output of the amplifier responsive to changes of input voltages to said amplifier.

6. Liquid level responsive means having, in combination, an audio-frequency vacuum tube amplifier, a source of electric potential therefor, an input circuit including a source of alternating electric current for said amplifier, current limiting and voltage reducing means in said input circuit, a container for fluids, means in the container exposed to said fluids and connected across said input circuit to short circuit the latter, and means in the output of the amplifier responsive to changes of input voltages to said amplifier.

GORDON E. EWERTZ.